US008860357B1

(12) United States Patent
Decady

(10) Patent No.: US 8,860,357 B1
(45) Date of Patent: Oct. 14, 2014

(54) UNIVERSAL POWER GENERATING SYSTEM

(76) Inventor: Robillard Decady, Miami, FL (US)

(*) Notice: Subject to any disclaimer, the term of this patent is extended or adjusted under 35 U.S.C. 154(b) by 370 days.

(21) Appl. No.: 13/306,601

(22) Filed: Nov. 29, 2011

(51) Int. Cl.
| H02J 7/00 | (2006.01) |
| H01M 10/44 | (2006.01) |
| H01M 10/46 | (2006.01) |
| B60K 16/00 | (2006.01) |
| B60L 8/00 | (2006.01) |
| B60L 9/00 | (2006.01) |
| F03D 9/00 | (2006.01) |
| H02P 9/04 | (2006.01) |

(52) U.S. Cl.
USPC .................. 320/101; 180/2.2; 290/44; 290/55

(58) Field of Classification Search
USPC .......................... 320/101; 180/2.2; 290/44, 55
See application file for complete search history.

(56) References Cited

U.S. PATENT DOCUMENTS

| 7,434,636 | B2* | 10/2008 | Sutherland | 180/2.2 |
| 8,253,262 | B1* | 8/2012 | Kiler | 290/44 |
| 2006/0278445 | A1* | 12/2006 | Chang | 180/2.2 |
| 2008/0179114 | A1* | 7/2008 | Chen | 180/2.2 |
| 2010/0182075 | A1* | 7/2010 | Yang et al. | 327/540 |
| 2011/0101698 | A1* | 5/2011 | Saluccio | 290/55 |
| 2011/0316470 | A1* | 12/2011 | Rogers | 320/101 |
| 2012/0038157 | A1* | 2/2012 | Skala | 290/44 |
| 2012/0049523 | A1* | 3/2012 | Bersiek | 290/44 |
| 2012/0187698 | A1* | 7/2012 | Bassett | 290/55 |
| 2012/0299527 | A1* | 11/2012 | Vo | 320/101 |
| 2013/0063071 | A1* | 3/2013 | Walters | 320/101 |

* cited by examiner

Primary Examiner — Richard V Muralidar
Assistant Examiner — David Henze-Gongola
(74) Attorney, Agent, or Firm — Albert Bordas, P.A.

(57) ABSTRACT

A universal power generating system, having a rechargeable battery bank with a plurality of rechargeable batteries; a computer; and an outside power source. The outside power source has a shaft, propellers are fixedly mounted onto the shaft. The shaft extends through electromagnetic generator systems. The universal power generating system also has at least one ultracapacitor and electrical circuitry. Fixedly mounted onto the shaft are hubs, each of the hubs have fan blades mounted thereon and permanent magnetic elements. The fan blades are shaped to cause the hubs, and therefore the shaft to rotate by wind force. The electromagnetic generator systems convert mechanical energy generated from rotation of the shaft to electrical energy that flows to a rotary alternative inverter, to a transformer and a power supply through electrical wiring and to the rechargeable battery bank. The at least one ultracapacitor provides power for electrical components of a vehicle.

1 Claim, 2 Drawing Sheets

UNIVERSAL POWER GENERATING SYSTEM

BACKGROUND OF THE INVENTION

1. Field of the Invention

The present invention relates to power generating systems, and more particularly, to a universal power generating system.

2. Description of the Related Art

Effective power generating systems are necessary to deal with the present global energy crisis. Strains on electricity grids and price increases in the supply of energy resources have taken great tolls. There has been an enormous increase in the global demand for energy in recent years as a result of industrial development and population growth. Supply of energy is, therefore, far less than the actual demand. In the United States, contributing causes include over-consumption, an aging infrastructure, and choke-point disruption or bottlenecks at oil refineries and port facilities that restrict fuel supply. Seasonal variables also take a toll, whereby unusually cold winters lead to increased consumption of energy. Pipeline failures and other accidents may cause minor interruptions to energy supplies. A crisis could possibly emerge after infrastructure damage from severe weather.

In response to the petroleum crisis, the principles of green energy and sustainable living movements have gained popularity. This has led to increasing interest in alternate power/fuel research such as fuel cell technology, liquid nitrogen economy, hydrogen fuel, methanol, biodiesel, Karrick process, solar energy, artificial photosynthesis, geothermal energy, Space-based solar power, tidal energy, wave power, and wind energy, and fusion power. To date, only hydroelectricity and nuclear power have been significant alternatives to fossil fuel.

Hydrogen gas is currently produced at a net energy loss from natural gas, which is also experiencing declining production in North America and elsewhere. When not produced from natural gas, hydrogen still needs another source of energy to create it, also at a loss during the process. This has led to hydrogen being regarded as a 'carrier' of energy, like electricity, rather than a 'source'. The unproven dehydrogenating process has also been suggested for the use water as an energy source. Efficiency mechanisms such as Negawatt power can encourage significantly more effective use of current generating capacity. It is a term used to describe the trading of increased efficiency, using consumption efficiency to increase available market supply rather than by increasing plant generation capacity. As such, it is a demand-side as opposed to a supply-side measure.

Therefore, several power-generating devices have been developed in the past. However, they provide for a number of more or less complicated features that fail to solve the problem in an efficient, economical and environmentally safe way. None of those devices suggest the novel features of the present invention.

SUMMARY OF THE INVENTION

The instant invention is a universal power generating system. It considerably increases power generating efficiencies over existing energy systems. It is energy efficient and environmentally safe. The present invention can be utilized in residential structures including homes, condos, townhomes, and apartments; commercial buildings and structures including stand-alone buildings and strip malls; and with industrial electrical systems.

Presently, the most efficient use of fuels produces approximately 35% waste. In comparison, the instant invention is 90% efficient whereby it recycles unused energy. Specifically, the only waste (loss) is heat and it is fed back to the system's battery bank. The instant invention therefore is able to replace or enhance efficiencies of combustion engines, diesel engines, gas turbines, hydroelectric power plants, wind turbines, solar heaters, hydrogen-oxygen rockets engine and fuel cells. It can also be used to improve solar power units, turbo fan windmill power units, natural gas and other fossil fuels and gas driven generators. It is cost effective and almost maintenance free and can be used in any applications that requires electrical power. The only limitations are due to the current technology, limiting the life cycle of rechargeable batteries. However, if fuel cells are used, the life of the energy source can be extended as long as there is a source of fuel. One advantage of the invention is that once it uses an outside power source to start operating, the power-generating unit generates power, requiring minimum maintenance. The market potential for the instant invention is boundless, large enough to supply energy to several cities or a small country.

More specifically, the instant invention is a universal power generating system, comprising a rechargeable battery bank having a plurality of rechargeable batteries; a computer; and an outside power source that provides constant power. The outside power source comprises a shaft that extends therefrom. Propellers are fixedly mounted onto the shaft at predetermined sections.

The instant invention also comprises electromagnetic generator systems, at least one ultracapacitor; and electrical circuitry. The shaft extends through the electromagnetic generator systems. Also fixedly mounted onto the shaft are hubs, each of the hubs has fan blades mounted thereon. The hubs also comprise permanent magnetic elements. The fan blades are shaped to cause the hubs, and therefore the shaft to rotate by wind force. The electromagnetic generator systems convert mechanical energy generated from rotation of the shaft to electrical energy that flows to a rotary alternative inverter. The electrical energy then flows from the rotary alternative inverter to a transformer and a power supply through electrical wiring of the electrical circuitry to the rechargeable battery bank. The at least one ultracapacitor provides power for electrical components of a vehicle. The electrical components include audio and/or video equipment, lighting systems, and electrical switches. The plurality of rechargeable batteries has electrochemical reactions that are electrically reversible. The rechargeable batteries comprise chemicals, including: lead-acid, nickel cadmium (NiCd), nickel metal hydride (NiMH), lithium ion (Li-ion), and lithium ion polymer (Li-ion polymer). Extending from the computer, electrical wiring of the electrical circuitry connects to a switch and to a voltage regulator.

The instant invention further comprises electromagnets having electrical coils. Electric current flowing through the electrical coils produces a magnetic field. The electromagnetic generator systems are mounted onto a vehicle. The vehicle is an automobile, sports utility vehicle, truck, recreational vehicle, bus, motorcycle, or train. When the vehicle is in motion, a wind force causes the propellers to spin, causing the shaft to rotate.

It is therefore one of the main objects of the present invention to provide a universal power generating system that is energy efficient and environmentally safe.

It is another object of this invention to provide a universal power generating system that generates cost efficient energy.

It is another object of this invention to provide a universal power generating system that can be utilized in residential structures including homes, condos, townhomes, and apartments; commercial buildings and structures including stand-alone buildings and strip malls; and with industrial electrical systems.

It is another object of this invention to provide a universal power generating system that minimizes pollution, acid rain, deforestation, global warming, ozone depletion layers, and other environmental catastrophes.

It is another object of this invention to provide a universal power generating system that is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
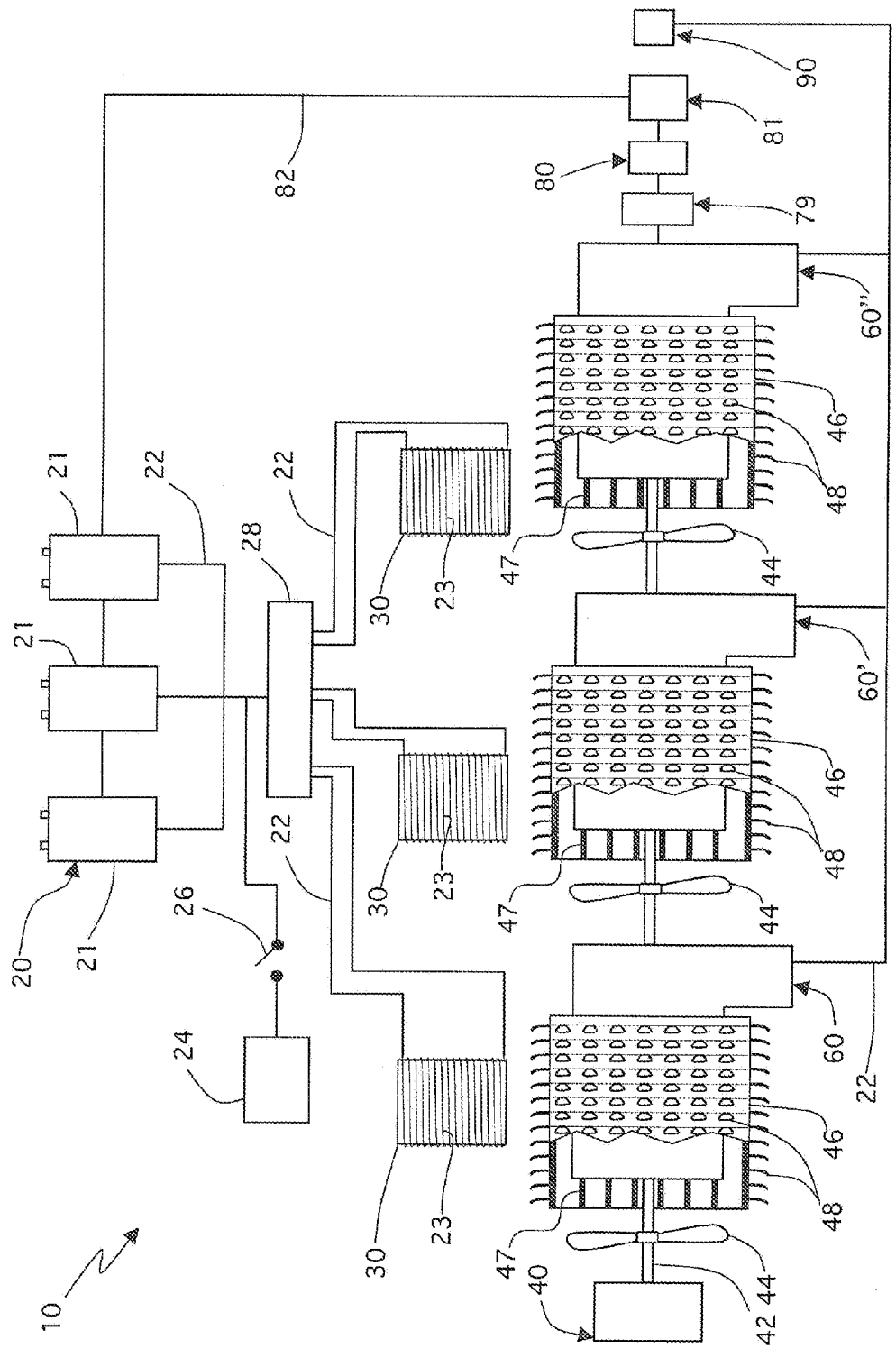
FIG. 1 is a schematic view of the universal power generating system, object of the present application.

Referring now to the drawings, the present invention is generally referred to with numeral 10. It can be observed that it basically includes rechargeable battery bank 20, computer 24, electromagnetic generator systems 60, 60', and 60", and at least one ultracapacitor 90.

Figure 2:
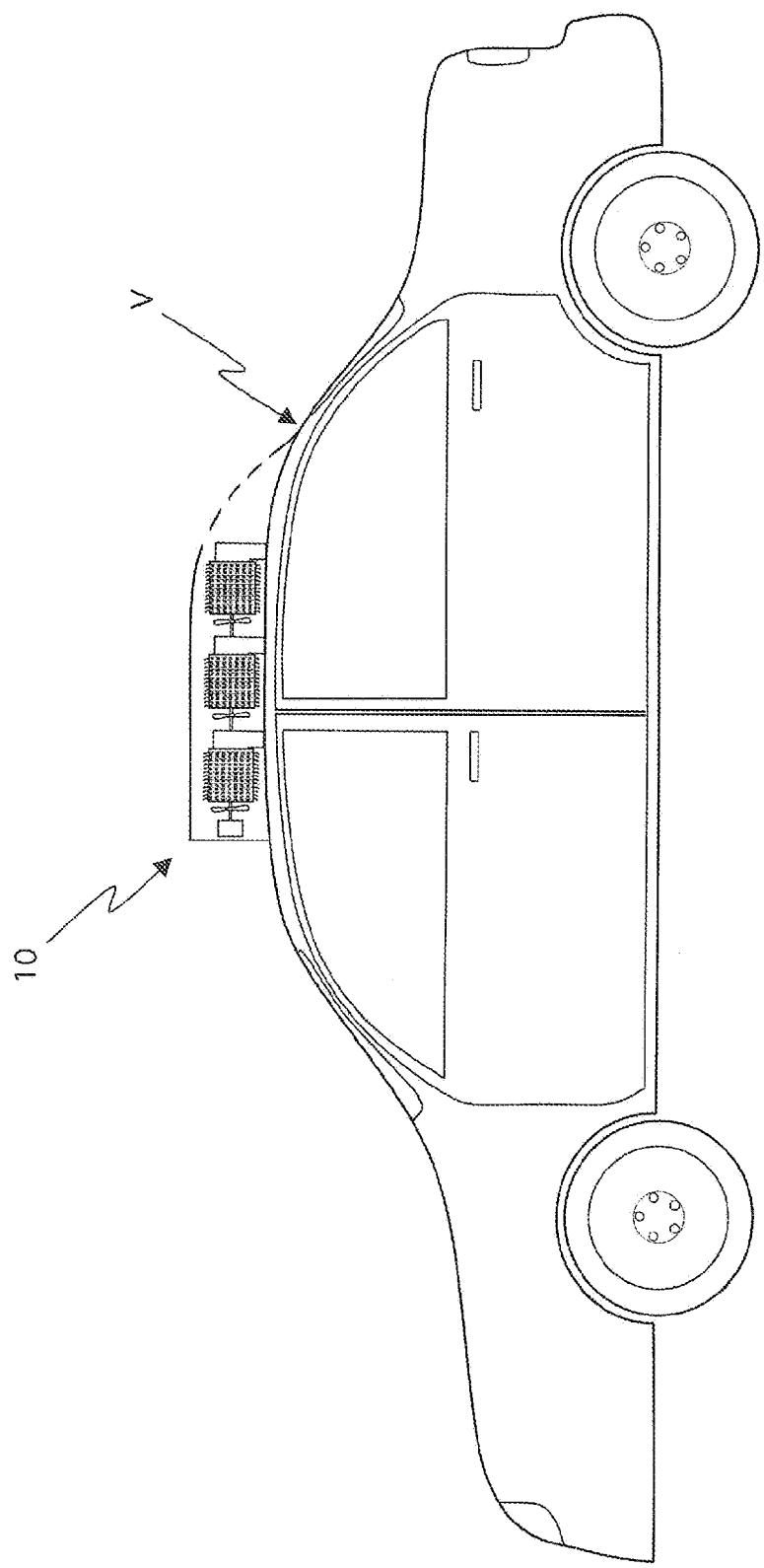
FIG. 2 is a schematic view of the universal power generating system, object of the present application mounted on a vehicle.

As seen in FIGS. 1 and 2, universal power generating system 10 produces electricity of any wattage. In operation, as an example when instant invention 10 is mounted onto vehicle V, such as an automobile, sports utility vehicle, truck, recreational vehicle, bus, motorcycle, or train, outside power source 40 provides constant power to instant invention 10. Shaft 42 extends from power source 40. Propellers 44 are fixedly mounted onto shaft 42 at predetermined sections. Shaft 42 extends through each of electromagnetic generator systems 60, 60', and 60". When vehicle V is in motion, a wind force causes propellers 44 to spin, causing shaft 42 to rotate. Also fixedly mounted onto shaft 42 are hubs 46 each having fan blades 48 mounted thereon. Hubs 46 also comprise permanent magnetic elements 47. Fan blades 48 are shaped to cause each respective hub 46, and therefore shaft 42 to rotate by wind force. Hubs 46 have a cooperative shape, such as substantially cylindrical, that facilitates its rotation, with fan blades 48 peripherally mounted thereto.

Electromagnetic generator systems 60, 60', and 60" convert mechanical energy generated from the rotation of shaft 42 to electrical energy that flows to rotary alternative inverter 79. Electrical energy then flows from rotary alternative inverter 79 to transformer 80 and power supply 81 through electrical wiring 82 to rechargeable battery bank 20. Electrical energy from electromagnetic generator systems 60, 60', and 60" also flows through electrical wiring 22 to ultracapacitor 90. Ultracapacitor 90 provides power for electrical components of vehicle V. The electrical components may be, but are not limited to, audio and/or video equipment, lighting systems, and electrical switches.

In a preferred embodiment, rechargeable battery bank 20 comprises a plurality of rechargeable batteries 21, defined as electrochemical cells. They are also known as secondary cells because their electrochemical reactions are electrically reversible. Rechargeable batteries 21 come in many different shapes and sizes, ranging anything from a button cell to megawatt systems connected to stabilize an electrical distribution network. Several different combinations of chemicals are commonly used, including: lead-acid, nickel cadmium (NiCd), nickel metal hydride (NiMH), lithium ion (Li-ion), and lithium ion polymer (Li-ion polymer). Rechargeable batteries 21 have lower total cost of use and environmental impact than disposable batteries. Rechargeable batteries 21 can be recharged and used many times.

Extending from computer 24, electrical wiring 22 connects to switch 26 and to voltage regulator 28. Electromagnets 30 each comprise electrical coils 23. An electric current from rechargeable batteries 21 flows to electrical coils 23 to produce a magnetic field. Electromagnets 30 magnify the magnetic fields to thousands of times the strength of the field of electrical coils 23, due to the high magnetic permeability μ of ferromagnetic material. The main advantage of electromagnets 30 over permanent magnets is that the magnetic field can be rapidly manipulated over a wide range by controlling the amount of electric current. A continuous supply of electrical energy is required to maintain the field. Computer 24 has software to operate switch 26 to activate the electric current from rechargeable batteries 21 to flows to electrical coils 23.

Electromagnetic generator systems 60, 60', and 60" function when magnetic fields are produced by the flow of electric currents through electrical coils 23. They operate with permanent magnetic elements 47 to cause each respective hub 46, and therefore shaft 42 to rotate. The magnetic fields disappear when the current is turned off. The strength of the magnetic fields generated is proportional to the amount of current. As above, electromagnetic generator systems 60, 60', and 60" convert mechanical energy generated from the rotation of shaft 42 to electrical energy that flows to rotary alternative inverter 79. Electrical energy then flows from rotary alternative inverter 79 to transformer 80 and power supply 81 through electrical wiring 82 to rechargeable battery bank 20.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A universal power generating system for vehicles, consisting of:
   A) a rechargeable battery bank comprising a plurality of rechargeable batteries;
   B) a computer;
   C) an outside power source that provides constant power, said outside power source comprising a shaft that extends therefrom, propellers are fixedly mounted onto said shaft at predetermined sections, also fixedly mounted onto said shaft are hubs, each said hubs having fan blades mounted thereon and permanent magnetic elements, said fan blades are shaped to cause said hubs, and therefore said shaft to rotate by wind force;
   D) three electromagnetic generator systems, said shaft extends through said three electromagnetic generator systems, said three electromagnetic generator systems are mounted onto a rooftop of said vehicle, said vehicle is an automobile, sports utility vehicle, truck, recreational vehicle, bus, motorcycle, or train, when said vehicle is in motion, a wind force causes said propellers to spin, causing said shaft to rotate;

E) at least one ultracapacitor; and

F) electrical circuitry, said three electromagnetic generator systems convert mechanical energy generated from rotation of said shaft to electrical energy that flows to a rotary alternative inverter.

* * * * *